United States Patent [19]

Kump

[11] Patent Number: 5,094,739

[45] Date of Patent: Mar. 10, 1992

[54] METHODS AND APPARATUS FOR TREATMENT OF WATER

[76] Inventor: Joseph A. Kump, 9822 Hummingbird La., Garden Grove, Calif. 92641

[21] Appl. No.: 326,078

[22] Filed: Mar. 20, 1989

[51] Int. Cl.$^5$ .............................. C25B 9/00; C25B 15/00
[52] U.S. Cl. ................................... 204/150; 204/149; 204/197; 204/248; 204/269
[58] Field of Search ............... 204/149, 272, 269, 248, 204/150, 197

[56] References Cited

U.S. PATENT DOCUMENTS

| | | | |
|---|---|---|---|
| 3,256,504 | 6/1966 | Fidelman | 204/150 |
| 3,425,925 | 2/1969 | Fleischman | 204/248 |
| 3,527,617 | 9/1970 | Prober | 204/272 |
| 3,873,434 | 3/1975 | King | 204/248 |
| 4,193,859 | 3/1980 | King | 204/269 |
| 4,325,798 | 4/1982 | Mack | 204/248 |

Primary Examiner—John Niebling
Assistant Examiner—Arun S. Phasge
Attorney, Agent, or Firm—Plante, Strauss, Vanderburgh & Connors

[57] ABSTRACT

There is disclosed a method and an apparatus for treatment of water in an electrolytic cell having stacked plates of magnesium and copper in alternating array, separated by thin metal, brass washers. The stacked plates are disposed transversely across a cylindrical treatment chamber, preferably with four stacks aligned on equally angular spacings within the chamber. The water to be treated is introduced into the chamber tangentially to the inner wall thereof and is directed over the stacked plates. The tangential introduction of water into the treatment chamber generates a vortex flow of the water across the electrolytic cells which accelerates clarification of the water by forced separation of the precipitates which are collected in the bottom of the separation chamber and periodically removed. The clarified water is removed from the treatment chamber and passed through subsequent processing. The method is applied to steam boilers, water heaters, cooling towers, and eliminates scaling and corrosion in subsequent equipment.

11 Claims, 4 Drawing Sheets

METHODS AND APPARATUS FOR TREATMENT OF WATER

BACKGROUND OF INVENTION

1. Field of Invention

This invention relates to methods and apparatus for the treatment of water and in particular to treatment of water for both domestic and industrial applications.

2. Brief Statement of the Prior Art

Municipal and industrial waters contain objectionable impurities, commonly referred to as hardness, which cause processing problems such as corrosion, scaling, etc. The scale which is formed is a calcite which has a hexagonal crystalline structure and which adheres to almost any surface such as pipes, boilers, heaters, cooling towers, shower walls, glass, sinks, etc. The scale forms more rapidly when water is heated and thus is particularly troublesome in water heaters and hot water systems by reducing heat transfer efficiency in heaters and clogging hot water pipes. Because the scale is extremely hard, it rapidly wears out faucets, valves, and pumps.

A method which has been developed for treatment of the waters comprises passing the water over an electrolytic cell containing magnesium anodes and copper cathodes. This treatment dissolves magnesium in the water and raises the pH of the water, resulting in removal of temporary hardness of the water and the formation of soft or flocculent aragonite precipitates of calcium. These precipitates are soft, non-adhesive. Water which has been treated in this method also dissolves previous deposits of calcite scale from pipes and equipment. Because the magnesium is provided as an anode, the system is electrolytically protected against corrosion. Additionally, the treatment removes or reduces the dissolved oxygen in the water, which also reduces the corrosivity of the treated water.

This treatment has been known for some time, e.g., see U.S. Pat. No. 3,342,712. Attempts to develop an efficient method and apparatus for practicing the method have, heretofore, found only limited success. Despite all the advantages this treatment offers, it has not, heretofore, found widespread acceptance because of the difficulties experienced in practicing the treatment.

The effective processing of water over a magnesium and copper electrolytic cell requires techniques to prevent polarization of the electrode surfaces and efficient removal of the soft, aragonite precipitates which are formed from the calcium in the water. Electrode assemblies of alternating, stacked magnesium and copper plates, separated by thin spacers have been used in an attempt to provide extended electrode surfaces that resist polarization. Conventional filters and sand and gravel beds have been used also to facilitate removal of the soft aragonite precipitates from the treated water. While these techniques have improved the treatment over that accomplished with the apparatus disclosed in the aforementioned patent, a highly efficient method which requires minimal maintenance has not previously been achieved.

BRIEF DESCRIPTION OF THE INVENTION

This invention comprises a method and an apparatus for use in the method for treatment of water with an electrolytic cell. The electrolytic cell comprises stacked plates of magnesium and copper in alternating array, separated by thin metal, brass washers. The stacked plates are disposed transversely across a cylindrical treatment chamber, preferably with four stacks aligned on equally angular spacings within the chamber. The water to be treated is introduced into the chamber tangentially to the inner wall thereof and is directed over the stacked plates. The tangential introduction of water into the treatment chamber generates a vortex flow of the water across the electrolytic cells. The vortex flow generated in the water accelerates clarification of the water by forced separation of the precipitates which are collected in the bottom of the separation chamber and periodically removed. The clarified water is removed from the treatment chamber and passed through subsequent processing. In the method as applied to steam boilers, the water is drawn from a low point in the return condensate tank and any solids which are formed or collected in this tank are continuously removed and passed with the water to the electrolytic treatment. After passing over the electrolytic cell, the water is passed to a separator where it is clarified of the suspended solids and returned to the condensate tank. The electrolytic cell is preferably removed on a monthly basis because the magnesium and copper plates become coated and the coatings reduce the efficiency of the cell. Cleaning the cell and replacing the dissolved magnesium on a monthly basis are important steps in the treatment.

In the method as applied to cooling towers, the water to be processed is drawn from a low point in the cooling tower water supply tank and is pumped through a sediment trap. Clarified water is passed to the cooling tower, and a water stream concentrated in suspended solids is passed over the electrolytic cell. The treated water is then passed to a clarifier for removal of suspended solids and the flocculent precipitate formed by the electrolytic treatment. In water heater applications, the water is continuously circulated in a loop from the water heater, through the electrolytic treatment chamber and a clarifier and the clarified hot water is returned to the water heater. Makeup cold water is preferably added to the loop of circulating water immediately before the electrolytic chamber.

In hot water heating systems, the circulating hot water is passed from the building and added to a continuously circulating stream of hot water from the water boiler. The resulting mixture is passed over the electrolytic cell and through a clarifier and the clarified hot water is returned to the water boiler.

BRIEF DESCRIPTION OF THE DRAWINGS

The invention will be described with reference to the Figures of which.

DESCRIPTION OF PREFERRED EMBODIMENTS

Figure 1:
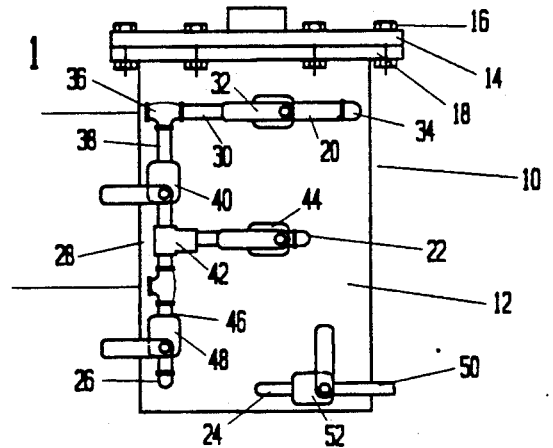
FIG. 1 illustrates the electrolytic treatment vessel used in the invention.

Referring now to FIG. 1, the treatment of the invention is practiced with an electrolytic cell 10 which is contained in an electrolytic treatment vessel 12. The vessel 12 is cylindrical and has a top cover 14 secured by fasteners such as bolts 16 to a flange 18 on the upper end of the vessel 12. The vessel 12 has an top tangential inlet nozzle 34, a similar tangential nozzle 22 located intermediate its height and a bottom drain nozzle 24. The vessel 12 also has a small diameter nozzle 26 located adjacent its bottom. A water manifold 28 is provided with an inlet line 30 that has an inlet valve 32 and is attached to the top inlet nozzle 34. The inlet line 30 has a tee 36 with a bypass line 38 also having a valve 40 and a subjacent tee 42 which communicates through a third valve 44 to the intermediate level nozzle 22. Valve 40 can also be used on a bypass valve for cleaning or changing the electrolytic cells, and when servicing the unit on a monthly basis.

This nozzle can be used as an outlet nozzle when the lower portion of the vessel is used as a solids settling chamber. The manifold 28 also has a small diameter branch line 46 which includes a valve 48 and is connected to the bottom nozzle 26 of the vessel 12. A drain line 50 with a valve 52 is attached to the bottom drain nozzle 24 of the vessel 12. The valves which are used are preferably manual valves with hand levers e.g., ball valves. Alternatively, automatically operated valves with value operators such as solenoids or air diaphragms can be used to automate the methods. Manual valves are, however, entirely serviceable since the electrolytic cell only needs periodic maintenance, e.g., once a month.

Figure 2:
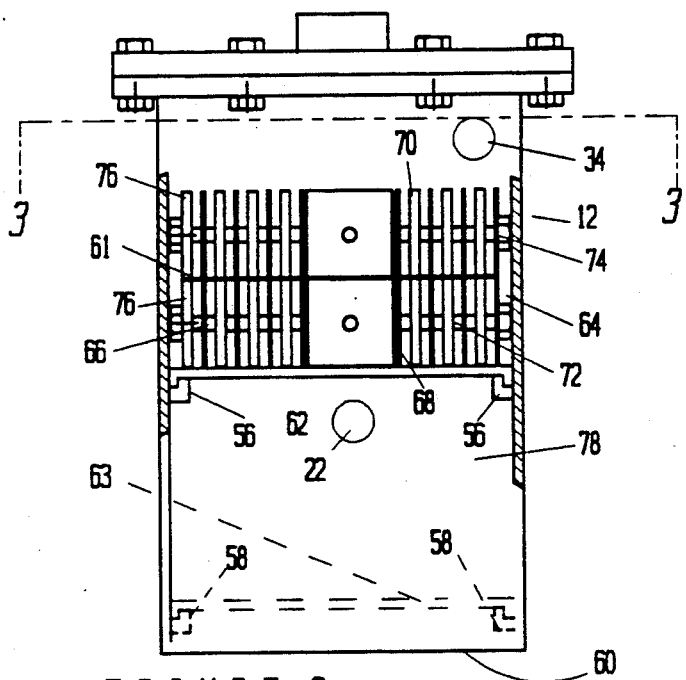
FIG. 2 is a sectional view along line 2—2' of FIG. 3.
Figure 3:
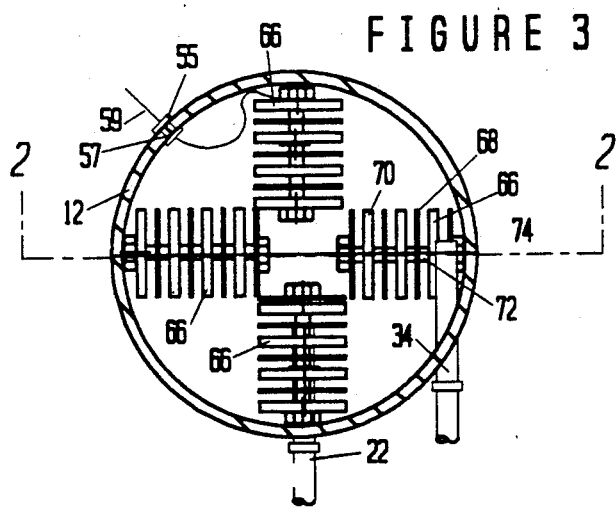
FIG. 3 is a sectional view along line 3—3' of FIG. 2.

Referring now to FIG. 2, there is illustrated the internals of the treatment vessel 12. The vessel 12 has shelf support brackets 56 on its internal wall at its mid-portion and, optionally, similar support brackets 58 adjacent its bottom wall 60. A foraminous shelf 62 such as a grate or coarse screen is supported on the shelf support 56, and a second foraminous shelf 63 can be supported on brackets 58. The shelf 62 supports the electrolytic cell 64 of the invention. As shown in FIGS. 2 and 3, the electrolytic cell has four electrolytic stacks 66 which are positioned transversely in the cylindrical chamber. The electrolytic stacks 66 are stacked arrays of copper plates 68 and magnesium plates 70, assembled in alternating sequence with spacers 72 therebetween. In the preferred embodiment, the electrolytic plates 68 and 70 are rectangular, preferably square. Each stack 66 of the electrolytic plates is secured with a single, centrally positioned assembly bolt 74. Preferably, each layer 76 of electrolytic cells 64 is formed of four stacks 66 arrayed with each stack on a radial of the treatment vessel 12, thereby forming a cross with each of the electrolytic stacks 66 comprising an arm of the cross.

Two or more layers of electrolytic cells 64 are superimposed in the vessel, resting on the support shelf 62, with a metallic, copper, plate 61 between the layers. All the stacks are thus in electrically continuity, and a conductor, wire 59, extends into the vessel through an aperture 57 which is sealed with a suitable grommet or seal 55. The other end of the conductor is attached to the supply pipe to complete the external electrical circuit of the system.

In the application shown in FIGS. 1-3, the lower half 78 of the vessel 12 serves as a water clarifier, and the treated water is removed through nozzle 22. In alternative applications requiring greater electrode surfaces, a second shelf such as 62 can be placed on the lower support brackets 58, thereby permitting incorporation of two additional layers of electrolytic cells. In such application, a second vessel is used as the clarifier for settling of the solids from the treated water. In this application, valve 44 is closed, and valve 52 is opened to remove the treated water through the lowermost nozzle 24 and line 50 (see FIG. 1).

As previously mentioned, the water is introduced into treatment by tangential introduction into the vessel 12. For this purpose, the inlet line is provided with an inlet nozzle 34 (see FIG. 3) which directs the water tangentially along the inside wall of the vessel 12 and directs against the adjacent stack of electrolytic plates. As the chamber is entirely flooded for the treatment, this tangential introduction of the water induces a swirling or vortex motion to the water, forcing rapid circulation of the water about and over the electrode plates.

Figure 4:
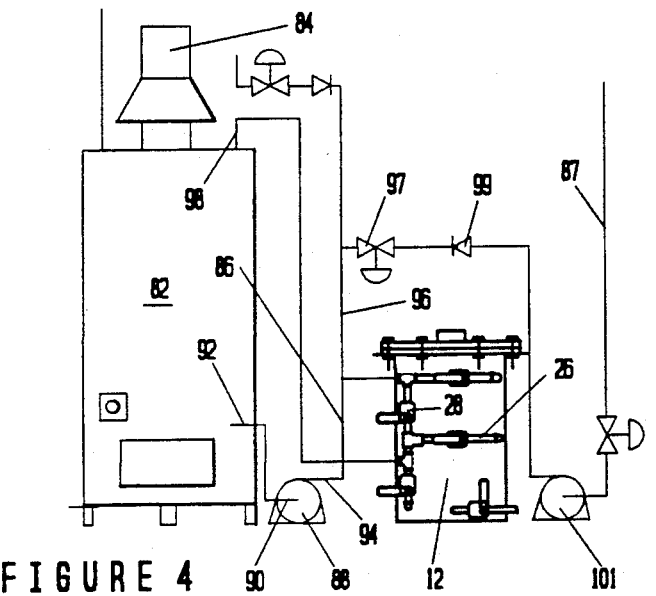
FIG. 4 illustrates the method for treatment of water in a water heater.

Referring now to FIG. 4, the method for treatment of water in a water heater will be described. The invention is applied to a conventional domestic or industrial water heater 82. In the illustration, a gas fired heater having a burner and flue 84 is illustrated. However, electrical water heaters could also be used. The method of treatment of the water is practiced by the forced circulation of the hot water in a continuously operated loop 86 through the electrolytic treatment vessel 12. For this application a pump 88 is connected with its suction 90 on a bottom drain 92 of the water heater 82. The discharge line 94 from the pump 88 is connected to the inlet line of the manifold 28 to the treatment vessel 12. Also connected to the inlet line of the manifold 28 of the treatment vessel 12 is a cold water supply line 96 with valve 97 and a check valve 99 so that makeup cold water can be added to the heating system. The water is circulated through the hot water lines of the serviced building and line 87 functions as a return line from the building which is connected to the suction side of pump 101 to circulate the water through the system.

The blended stream of recirculating hot water and newly added cold water is passed to the inlet of the vessel with the valve in the branch line being closed. The clarified water is withdrawn from the intermediate nozzle 26 with the valve open and is withdrawn from the outlet line of the manifold 28 and returned to the water heater 82 through a line connected to the cold water inlet 98 for the water heater.

In a typical application for a 100 gallon water heater, the pump capacity which is provided is sufficient to continuously circulate 10-15 gallons per minute of water through the electrolytic treatment vessel. With this treatment, the treatment vessel will need periodic servicing for the removal of precipitates from the bottom drain nozzle approximately once each month. This is accomplished by shutting off the pump, closing the value on the inlet nozzle, opening the valve in the branch line, closing the valve to the intermediate nozzle and opening the lower valve of the small diameter branch line to direct water into the lower most portion of the vessel, flushing the solids contained therein to and through the bottom drain nozzle.

In a typical application for monthly servicing, the electrolytic cells which will be provided are as illustrated in FIG. 2, and approximately 1-3 pounds of magnesium and 0.1 to 1 pound of copper are provided for each apartment or house serviced by the system. The copper is provided in the form of thin plates approximately 0.1 to 0.25 inch in thickness and separated by spacers of approximately 0.125 inch thickness.

Figure 5:
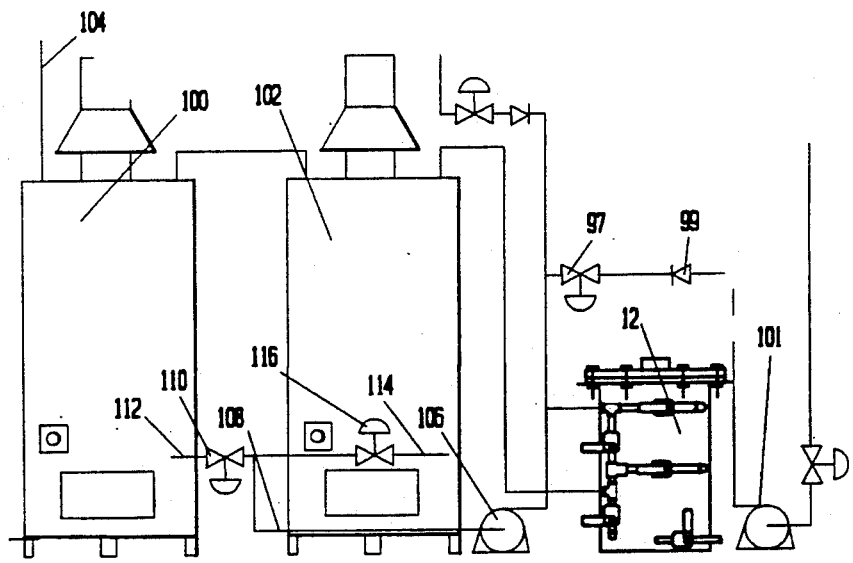
FIG. 5 illustrates the treatment of the invention applied to a plurality of water heaters.

When a plurality of water heaters are used, such as shown in FIG. 5, they are preferably manifolded together in tandem as shown with the second heater 100 receiving preheated water from the first heater 102 and discharging hot water to the service line 104. The circulation pump 106 of the system is connected with its suction side 108 to a manifold 110 that is connected to both of the bottom nozzles 112 and 114 of the water heaters, preferably through shutoff valves such as 116. The treatment thus can be used to remove equal quantities of hot water from both water heaters or, alternatively, to remove heated water from either of these heaters alone. Preferably, the water is continuously drawn from the water heaters, thereby insuring that any sediment which is formed in both heaters will be removed and passed to the treatment vessel.

Figure 6:
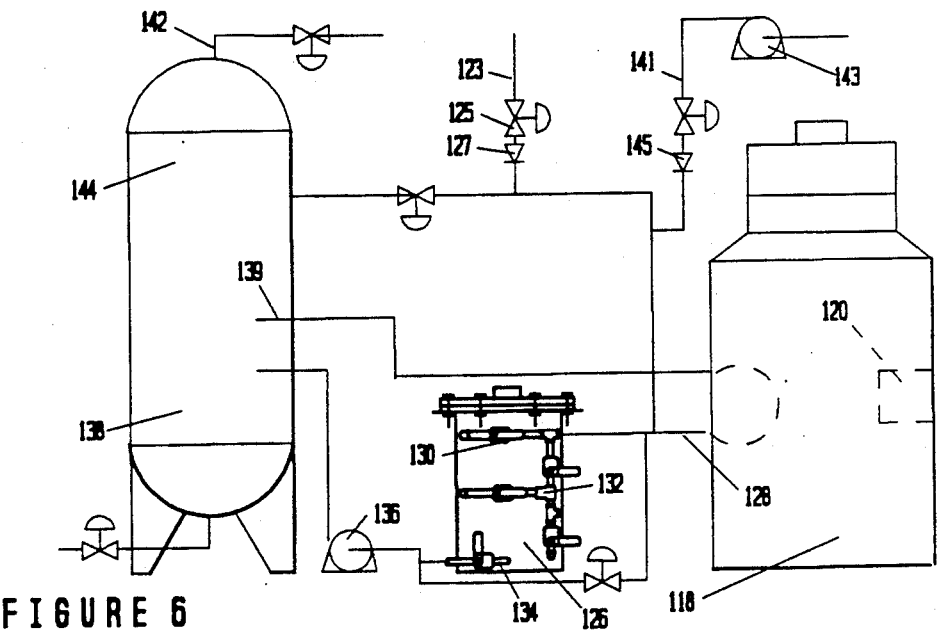
FIG. 6 illustrates the treatment applied to a hot water boiler system.

FIG. 6 illustrates the invention as applied to treatment of water in a hot water boiler 118. The hot water boiler 118 is very conventional boiler, typically gas-fired which has its own water circulation pump 120 for forced circulation of water over the heating tubes of the boiler. The boiler is in a hot water circulation loop through the building or other facilities with a return water line which has a circulation pump 143. A check valve 145 is also provided in the return line. The system receives inlet cold water through line 123 which has a control valve 125 and a check valve 127.

In this application of the invention, the water is continuously circulated from the water boiler 118 to the electrolytic vessel 126 by a line 128 that is connected directly to the inlet line 130 of the manifold 132 of the vessel 126. The vessel 126 shown in this application is provided with four layers of electrolytic cells and in this application, the treated water is withdrawn from the lower nozzle 134 of the vessel 126. For this application, the treatment system circulation pump 136 is mounted with its suction connected to the lower nozzle 134 and its discharge connected to the inlet of a clarifier vessel 138. The treated water is introduced tangentially into a cylindrical treatment vessel 138 for forced separation of the precipitates and sediment formed in the water during treatment, The clarified water is removed from an intermediate nozzle 140 of the clarifier vessel 138, and returned directly to the water boiler 118. Hot clarified water is also removed from nozzle 142 located at the center of the top 144 of the treatment vessel 126. Provision is made for the circulation of hot water in the system through line 141 which is provided with a pump 143 and a check valve 145.

Figure 7:
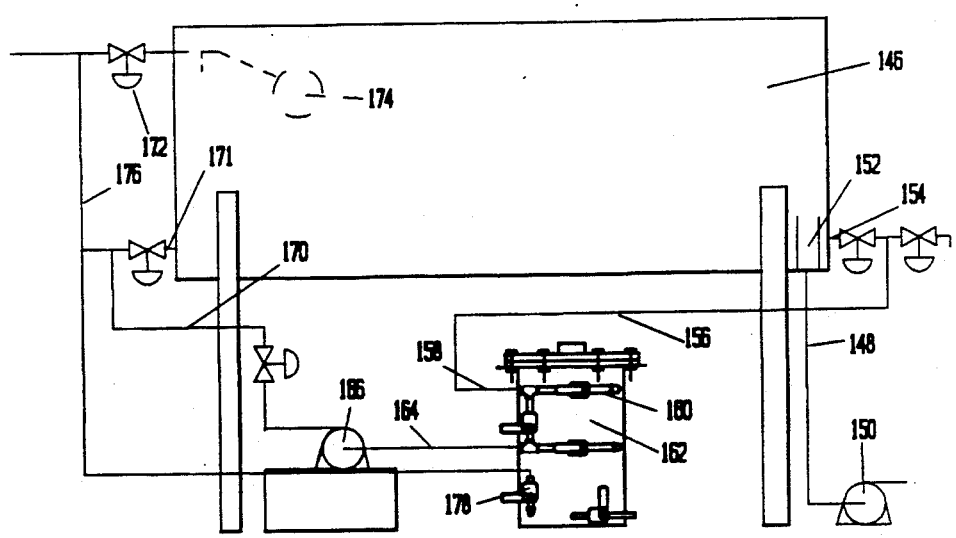
FIG. 7 illustrates the treatment of the invention applied in a steam boiler system.

Referring now to FIG. 7, the invention is illustrated as applied to a steam boiler system. In this system, the condensate which is returned from the steam operated facilities is collected in a returned condensate tank 146. The condensate tank 146 has a bottom drain 148 that is connected to the condensate pump 150 which discharges water to the boiler. In this application of the invention, an internal nozzle or leg 152 is mounted inside the condensate tank 146, surrounding the drain 148, thereby elevating the water removal approximately 5 to 6 inches. This permits the condensate tank 146 to function as a supplemental clarifier so that sediment which is formed in the water is collected on the bottom of the condensate tank.

A nozzle 154 is provided at the bottom of the condensate tank 146 and this nozzle is connected to a line 156 that passes to the inlet line 158 of the manifold 160 of the treatment vessel 162. The discharge line 164 of the manifold 160 of the electrolytic treatment vessel 162 is connected to the suction of the circulation pump 166 of the water treatment system for return to the condensate tank. Preferably, the return line 170 is connected to a nozzle located on the bottom of the condensate tank at a point opposite from the removal nozzle 154 so that the flow of water through the tank will flush sediment in the tank towards the removal nozzle 154, insuring its removal from the condensate tank 146. The cold water supplied to the boiler is added through a level control valve 172 having a suitable level control such as a float 174 in the condensate tank 146. A branch line 176 is provided which is connected to the lower inlet nozzle 178 of the electrolytic treatment vessel 162 for periodic flushing or purging of solids from the electrolytic vessel 162.

Figure 8:
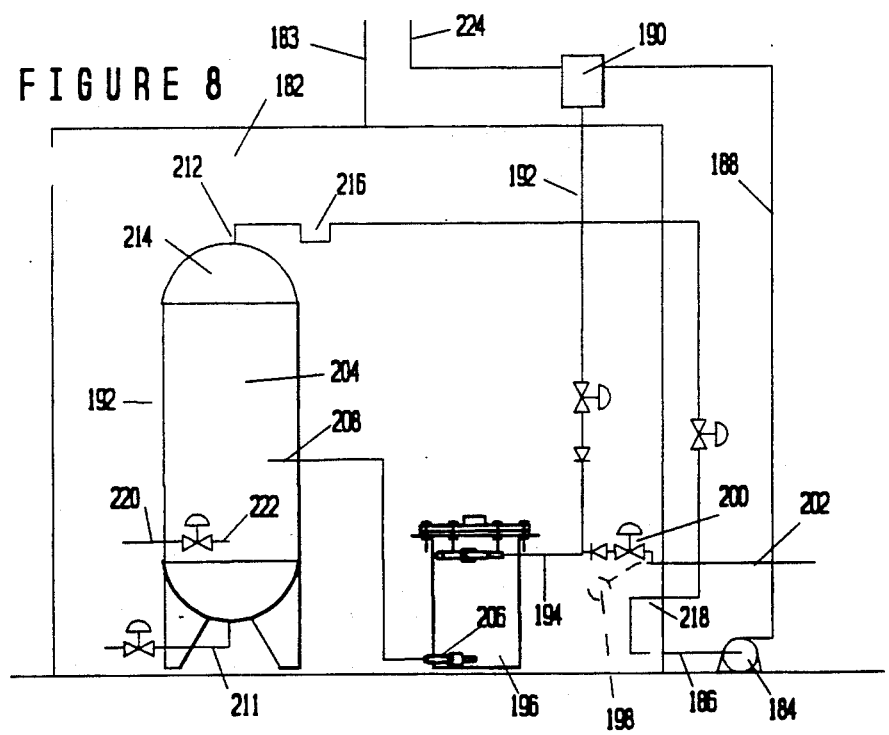
FIG. 8 illustrates the treatment as applied to a cooling tower.

Referring now to FIG. 8, the invention is shown as applied to treatment of water of a cooling tower. The water from the cooling tower is collected at the base of the cooling tower or in a subjacent collection vessel 182, through line 183. Typically, sediment which is formed in the cooling tower will collect or accumulate in the lower portions of this vessel 182. The cooling tower recirculation pump 184 is connected to a bottom nozzle 186 of the tower, and the discharge of the recirculation pump 184 is connected to a line 188 passing to the upper portions of the cooling tower for recirculation of the water downwardly over the internal heat exchanger (not shown) of the cooling tower.

In this application, a sediment trap 190 is provided in the cooling tower recirculation line 188 to settle any solids which are suspended in the water. The clarified water is passed through line 224 to the top of the cooling tower. A water stream which is concentrated in suspended sediment and solids is withdrawn through a line 192 that is connected to the bottom of the sediment trap 190. This line discharges to the inlet line 194 of the electrolytic vessel 196. The cooling tower is also commonly supplied with a level controller in the form of a float valve 198 (shown in hidden object lines) that operates a valve 200 in the inlet cold water line 202. This water line is passed directly to the inlet line 194 of the electrolytic vessel 196 of this invention. The blended stream of make up water and the recycled, concentrated sediment water from the sediment trap 190 is passed into the treatment vessel 196. In the illustrated application, the treatment vessel 196 is entirely filled with the four layers of electrolytic cells and a second water clarification vessel 204 is provided adjacent the treatment vessel 196.

The treated water is removed through the lower nozzle 206 of the vessel 196 and passed to an inlet nozzle 208 of a separate clarifier vessel 204 at approximately its middle elevation. Clarified water is withdrawn from a centrally located nozzle 212 in the top 214 of the clarifier vessel 204 and is passed through a conventional vacuum trap 216 to the cooling tower 182, preferably through a nozzle 218 internally located in the cooling tower tank to direct the clarified water towards the nozzle 186 from which the circulation pump 184 draws the recirculation water. A water line 220 is connected to the lower nozzle 222 of the clarifier vessel 204 to permit periodic flushing of solids and sediment through the drain nozzle 211.

The treatment of water with this invention will eliminate all temporary hardness. The electrolytic treatment dissolves magnesium in the water and liberates hydroxyl ions, thus raising the pH of the water. Hydrogen is formed at the anode of the cell, and the hydrogen effectively eliminates all dissolved oxygen. The increase in alkalinity of the water also results in elimination of the temporary hardness by decomposing the bicarbonates and liberating carbon dioxide. This treatment changes the structure and properties of precipitates of calcium from the hard and highly adhesive calcite to a soft aragonite crystalline form. The resulting precipitates can be readily settled and removed from the treatment system.

The water which is treated in the invention is substantially non-corrosive. Because it has been depleted of oxygen, it is ideally suited for use in steam boilers, cooling towers, and water heaters for commercial and for domestic uses. The treatment system also protects against corrosion since it provides anodic protection, and metals in contact with the water, such as iron or steel piping, copper or brass fittings, etc., do not corrode as they have a lesser oxidation potential, i.e., are electrically more negative than magnesium.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a treatment of steam boiler water in which water is circulated through heater tubes of a steam generator to generate steam and condensate containing sediment is returned and collected in a return condensate tank and fresh, make-up water is added to said condensate tank, the improvement in water treatment which comprises:
   a. clarifying the return condensate to settle said sediment in said condensate tank, removing a clarified recycle water feed from the upper portion of said condensate tank;
   b. removing a settled water stream concentrated with said sediment from a location in the lower portion of said condensate tank;
   c. passing said settled water stream over a magnesium-copper electrode assembly comprising alternating magnesium and copper plates secured together in mechanical and electrical continuity to dissolve magnesium in said water, raise the pH of said water, and form a treated water stream containing a flocculent, calcium-containing precipitate;
   d. settling said flocculent calcium-containing precipitate and said sediment from said treated water stream to obtain a clarified and treated water stream; and
   e. returning said clarified and treated water stream to said return condensate tank.

2. The treatment of claim 1 wherein said sediment settled in said return condensate tank is flushed towards the location from which said settled water stream is withdrawn.

3. In a method for the treatment of water in a water heater system in which cold water containing calcium bicarbonate is introduced into a water heater and heated water is withdrawn therefrom, the improved treatment which comprises: continuously withdrawing heated water from the water heater, adding cold make up water to said withdrawn heated water as required to maintain a constant volume of water in said heater, and passing said withdrawn heated water and cold make up water over a magnesium-copper electrode assembly comprising alternating magnesium and copper plates secured together in mechanical and electrical continuity to dissolve magnesium therein, raise the pH of said water and form a treated water stream containing a flocculent, calcium-containing precipitate; permitting said precipitate to settle and obtain a clarified and treated water stream; and returning said clarified and treated water stream to said water heater tank.

4. In a method for the treatment of water in a cooling tower wherein water is collected in a cooling tower supply tank and circulated therefrom over a cooing tower heat exchanger, the improved method of treatment which comprises: clarifying the water collected in said cooling tower supply tank by permitting solids contained in said water to settle within said supply tank, withdrawing a water stream from the lower portion of said supply tank to withdraw a water stream concentrated in suspended solids, passing said withdrawn water stream through a solids separator to obtain a clarified water stream which is passed to contact with said heat exchanger and a settled water steam which is further concentrated in suspended solids and adding fresh, make-up water to said settled water stream; passing said settled water stream and make-up water over a magnesium-copper electrode assembly comprising alternating magnesium and copper plates secured together in mechanical and electrical continuity to dissolve magnesium therein, raise the pH of said water and form a treated water stream containing a flocculent, calcium-containing precipitate; permitting said precipitate and said solids to settle and obtain a clarified, treated water stream; and returning said clarified, treated water stream to said cooling tower supply tank.

5. A water treatment unit which comprises:
   a. a shell having a cylindrical chamber with an inlet nozzle adjacent its upper edge and mounted tangentially to its inside wall;
   b. a stationary foraminous support plate located immediately above said outlet nozzle;
   c. a magnesium-copper electrode assembly comprising alternating magnesium and copper plates secured together in mechanical and electrical continuity in a stacked, stationary array mounted on said support plate to extend transversely across said chamber with its opposite ends adjacent opposite sidewalls of said chamber; and;
   d. a water outlet nozzle located immediately beneath and adjacent said foraminous tray, and
   e. a drain nozzle located adjacent the lower end of said chamber.

6. The unit of claim 5 wherein said electrode assembly comprises at least four stacks of said plates each of which is radially mounted within said cylindrical chamber.

7. The unit of claim 6 including at least a pair of layers of said stacks of plates, with at least four stacks in each layer.

8. The unit of claim 5 including a drain nozzle located adjacent the lower end of said chamber.

9. The method of treating water by passing the water over stacked electrode cells of magnesium anodes and copper cathodes in which comprises:
   f. placing a stationary array of stacked electrode cells transversely across a cylindrical chamber at an intermediate height within said chamber to provide an upper electrode region and a subjacent solid settling region in said chamber;

g. introducing water tangentially into said chamber and directing the tangential flow of water across said stationary array of stacked electrode cells to dissolve magnesium in said water and form calcium-containing solids as a flocculent precipitate;

h. centrifugally separating said calcium-containing solids formed in said water during passage over said electrode cells by the tangential flow of water through said chamber to obtain a clarified water stream and separated solids;

i. removing said clarified water stream from a region of the chamber immediately beneath and adjacent said stacked electrode cells and above said solid settling region of said chamber; and j. collecting the separated solids from said water in the bottom of said chamber and periodically removing said solids from said chamber by withdrawing said solids from the bottom of said chamber.

10. The method of claim 9 including the step of removing said separated solids from said chamber.

11. The method of claim 9 which comprises heating said water prior to its passage over said electrode cells.

* * * * *

UNITED STATES PATENT AND TRADEMARK OFFICE
CERTIFICATE OF CORRECTION

PATENT NO. : 5,094,739

DATED : March 10, 1992

INVENTOR(S) : Joseph A. Kump

It is certified that error appears in the above-identified patent and that said Letters Patent is hereby corrected as shown below:

Column 8, line 14, delete "cooing" and insert therefor --cooling--.

Column 8, line 24, delete "steam" and insert therefor --stream--.

Signed and Sealed this

Fourth Day of May, 1993

*Attest:*

MICHAEL K. KIRK

*Attesting Officer*

*Acting Commissioner of Patents and Trademarks*